July 12, 1932.  C. O. REEPS  1,867,173
AUTOMATIC IRONING PRESS
Filed Aug. 16, 1929  14 Sheets-Sheet 10
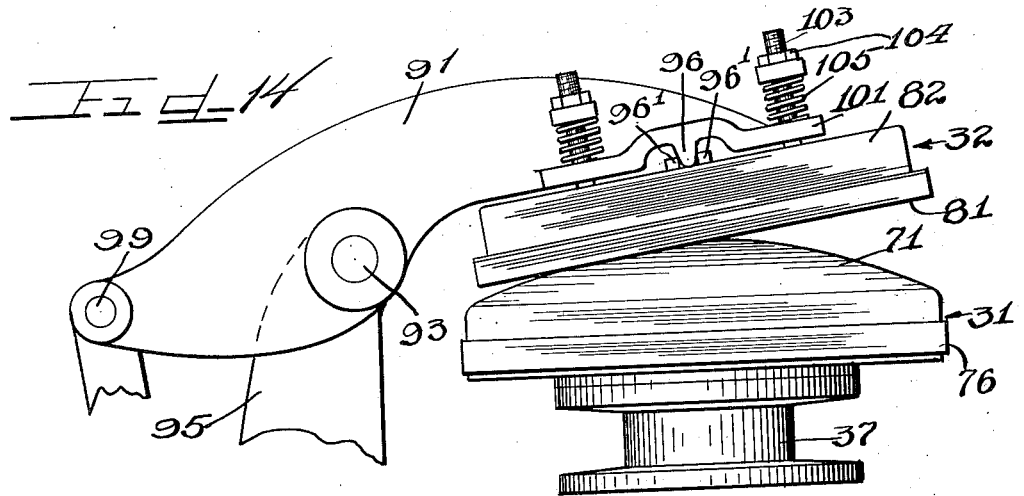
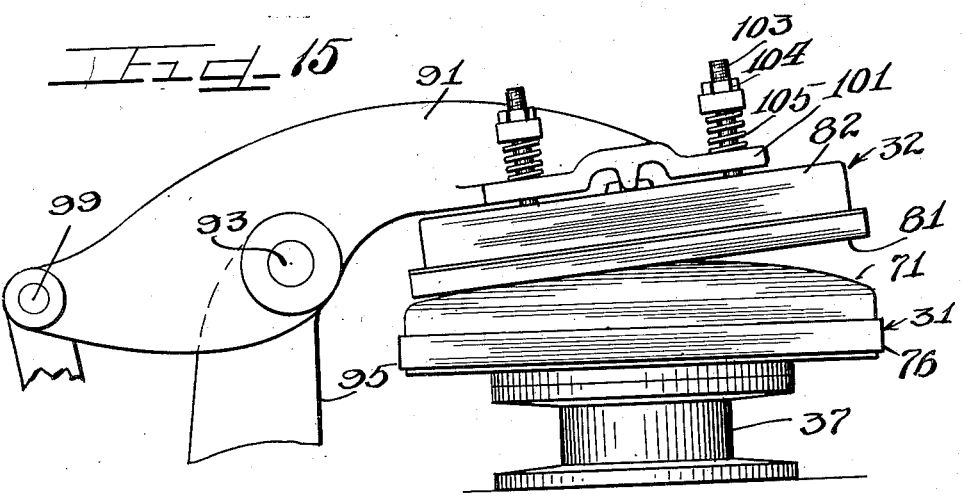
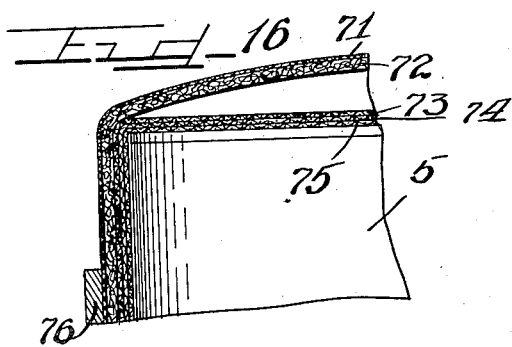
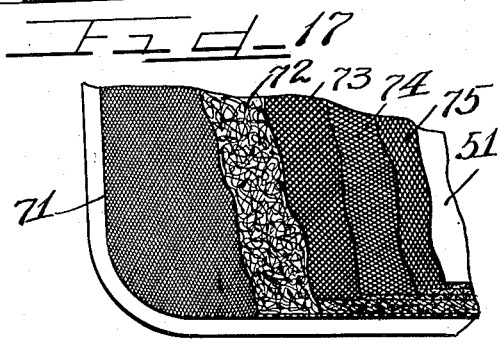
Inventor
Charles O. Reeps
by Attys.

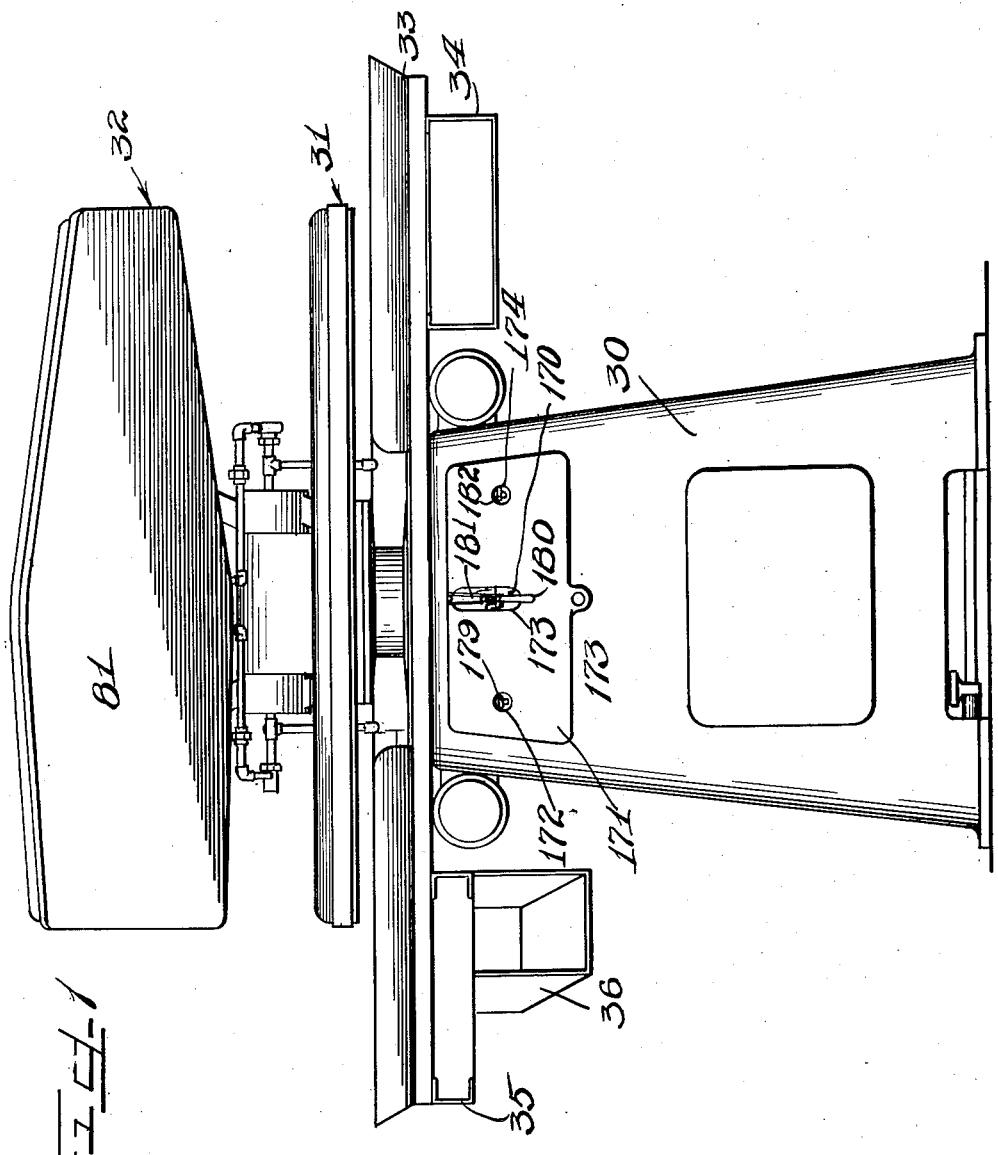

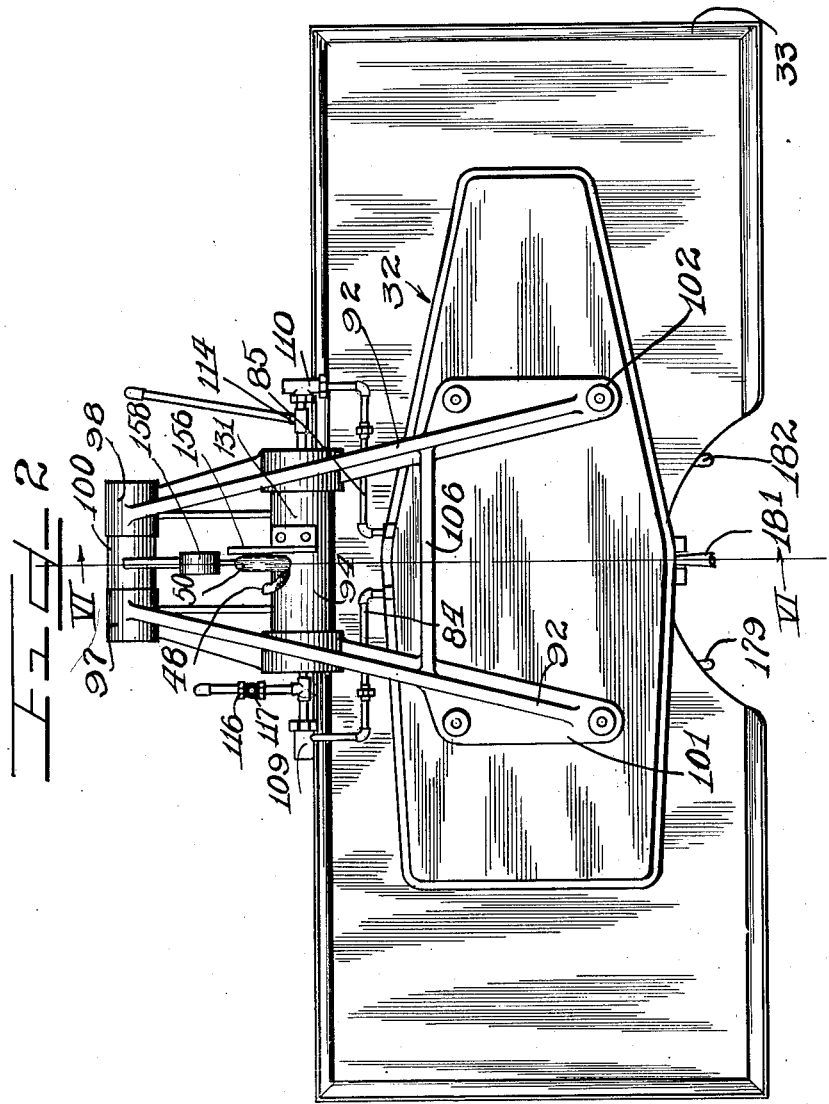

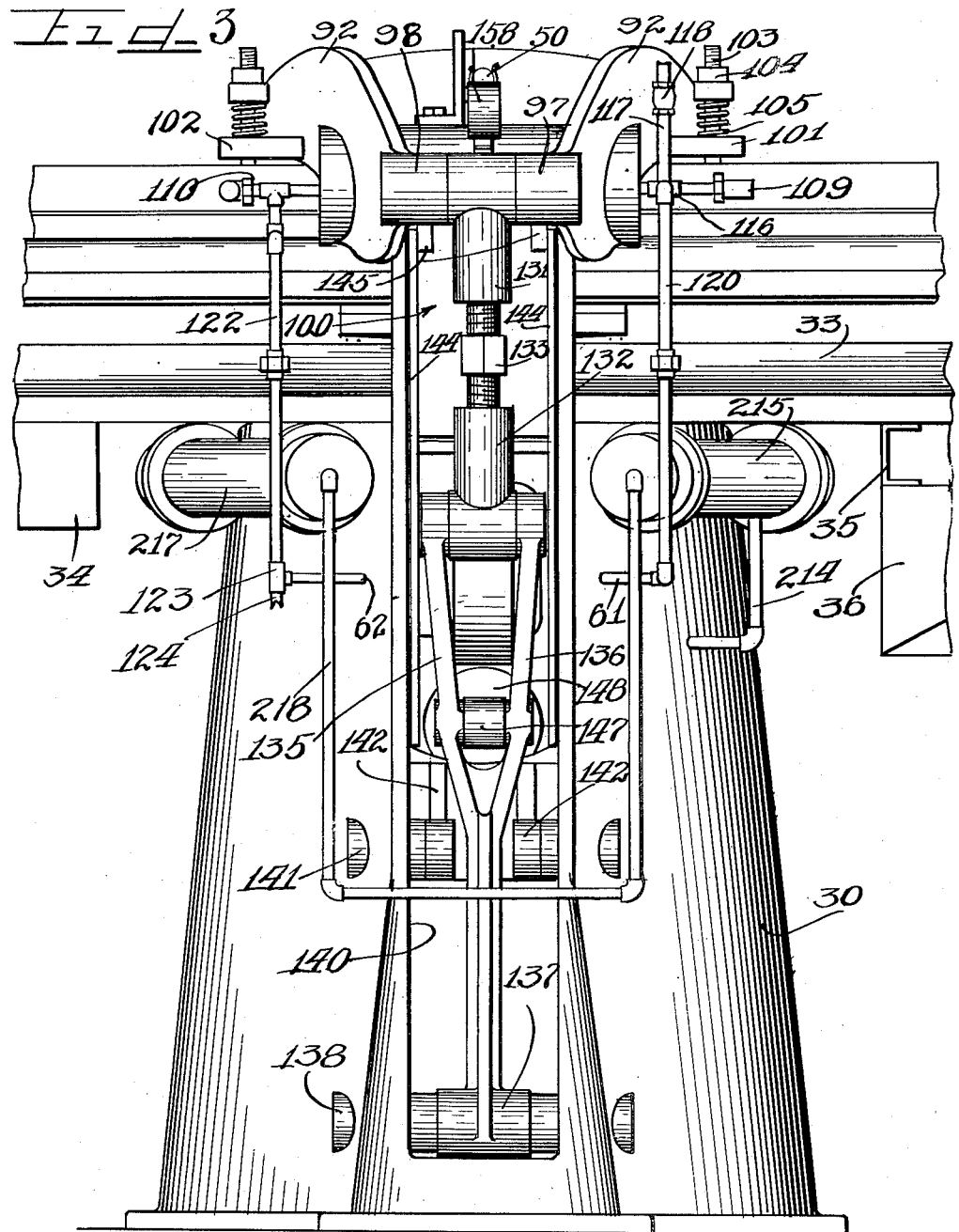

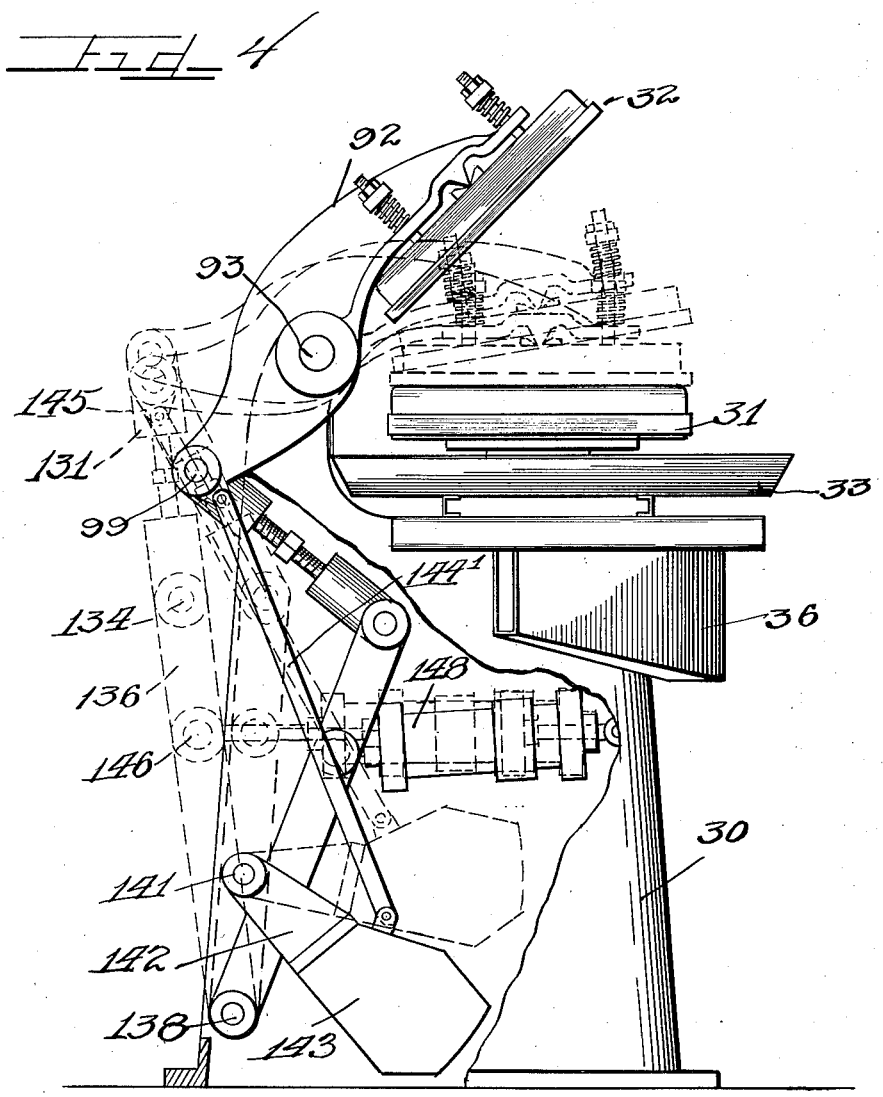

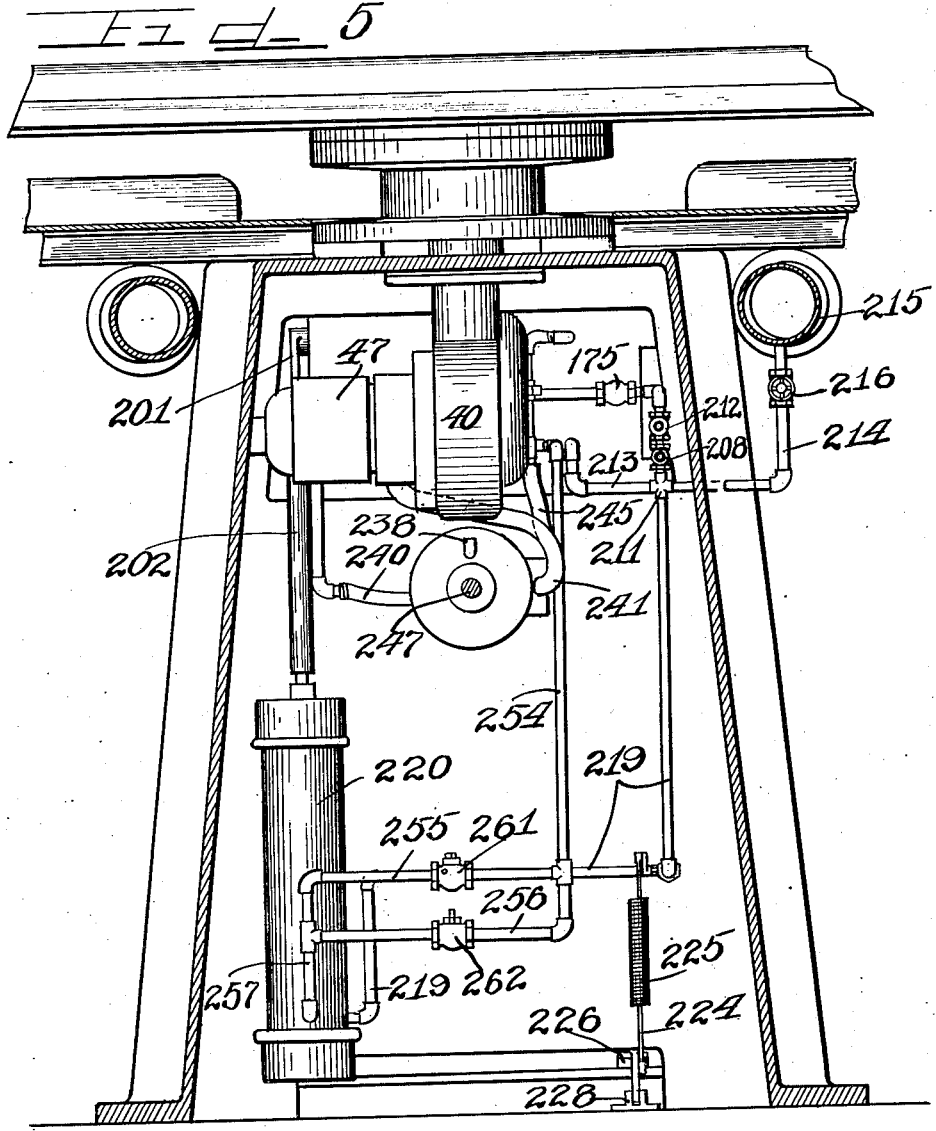

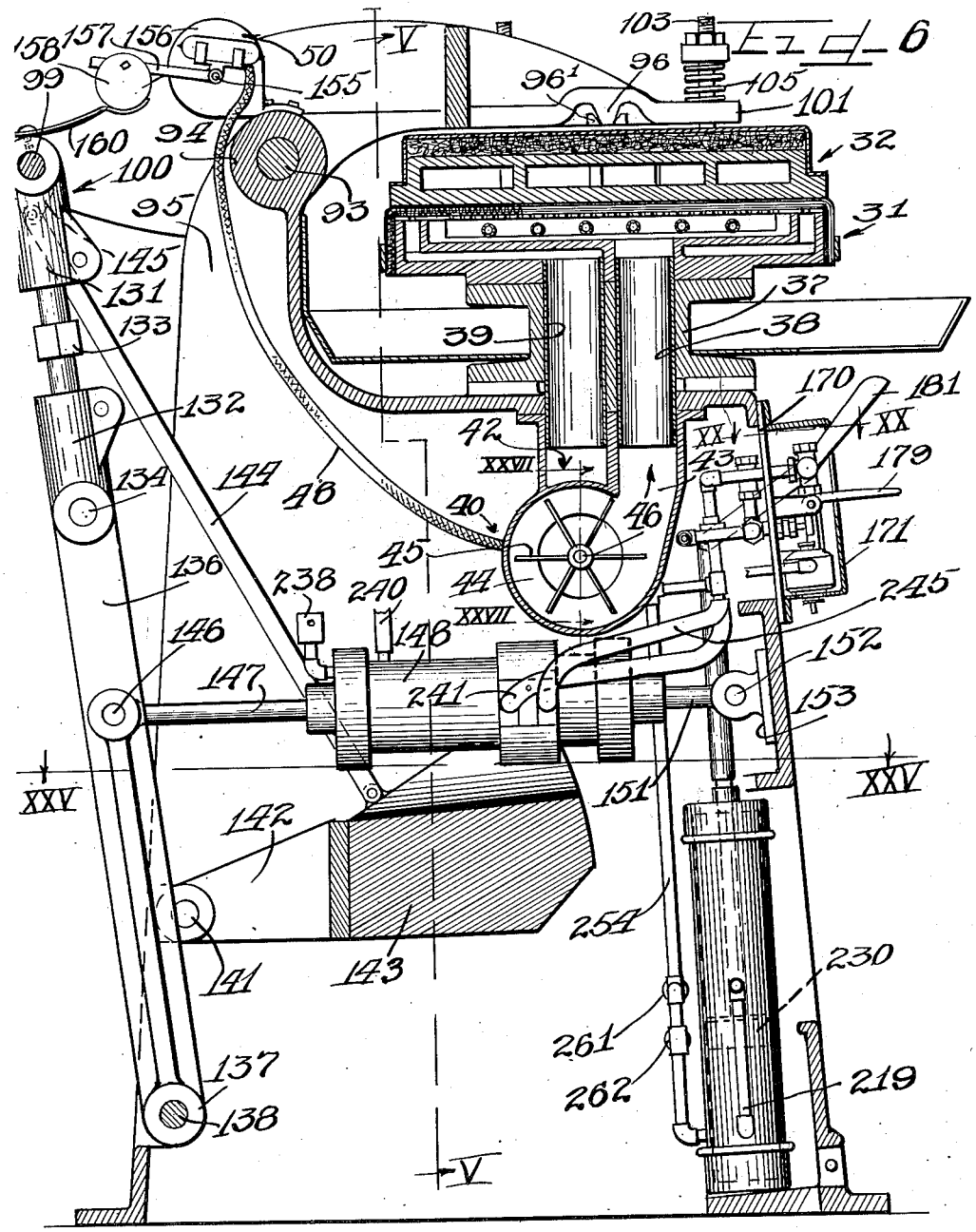

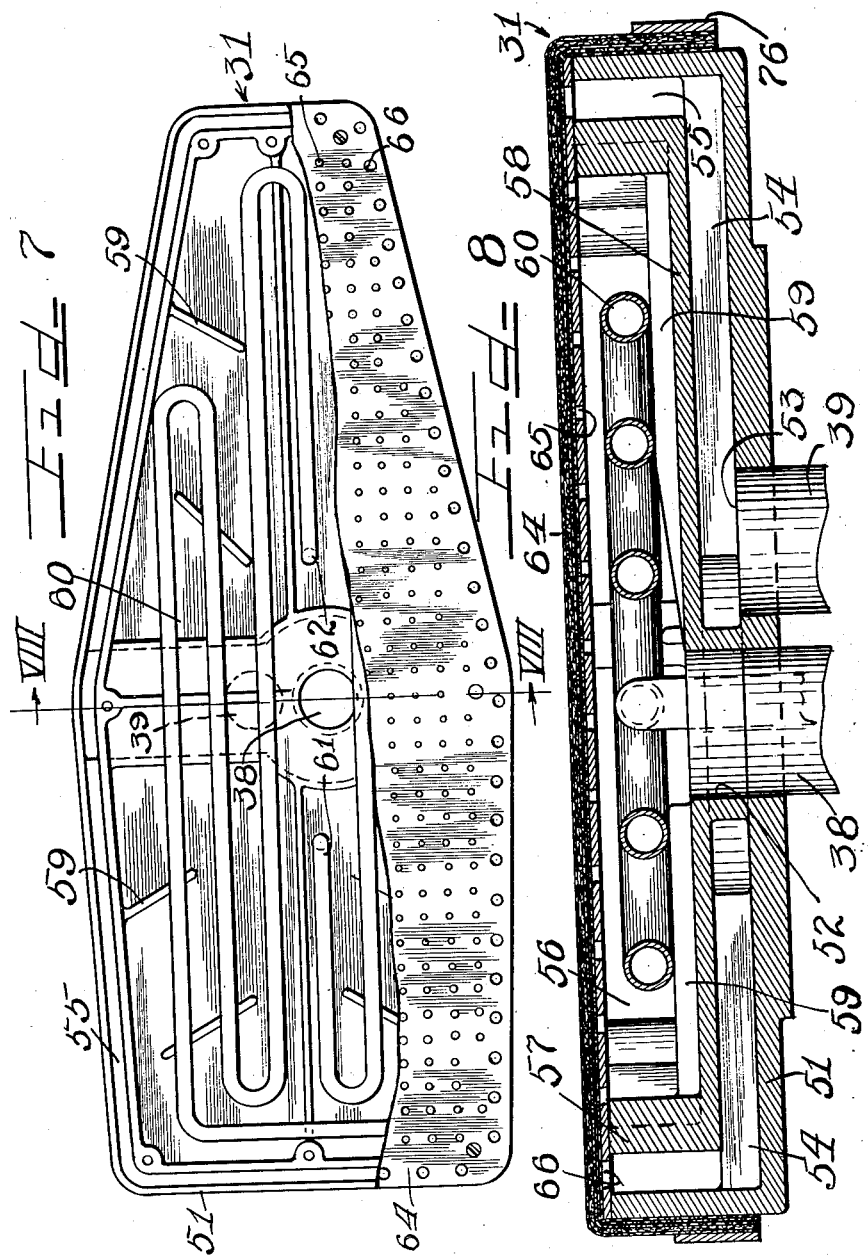

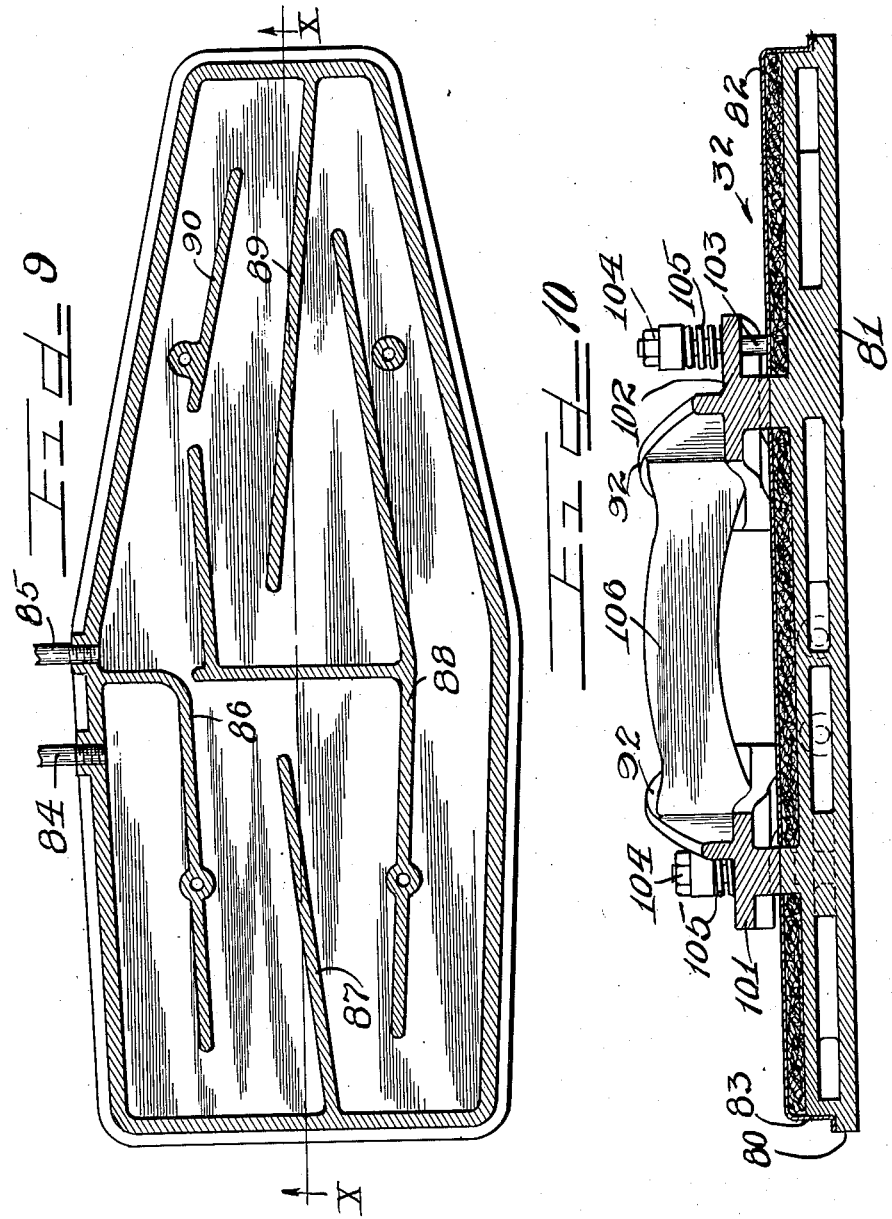

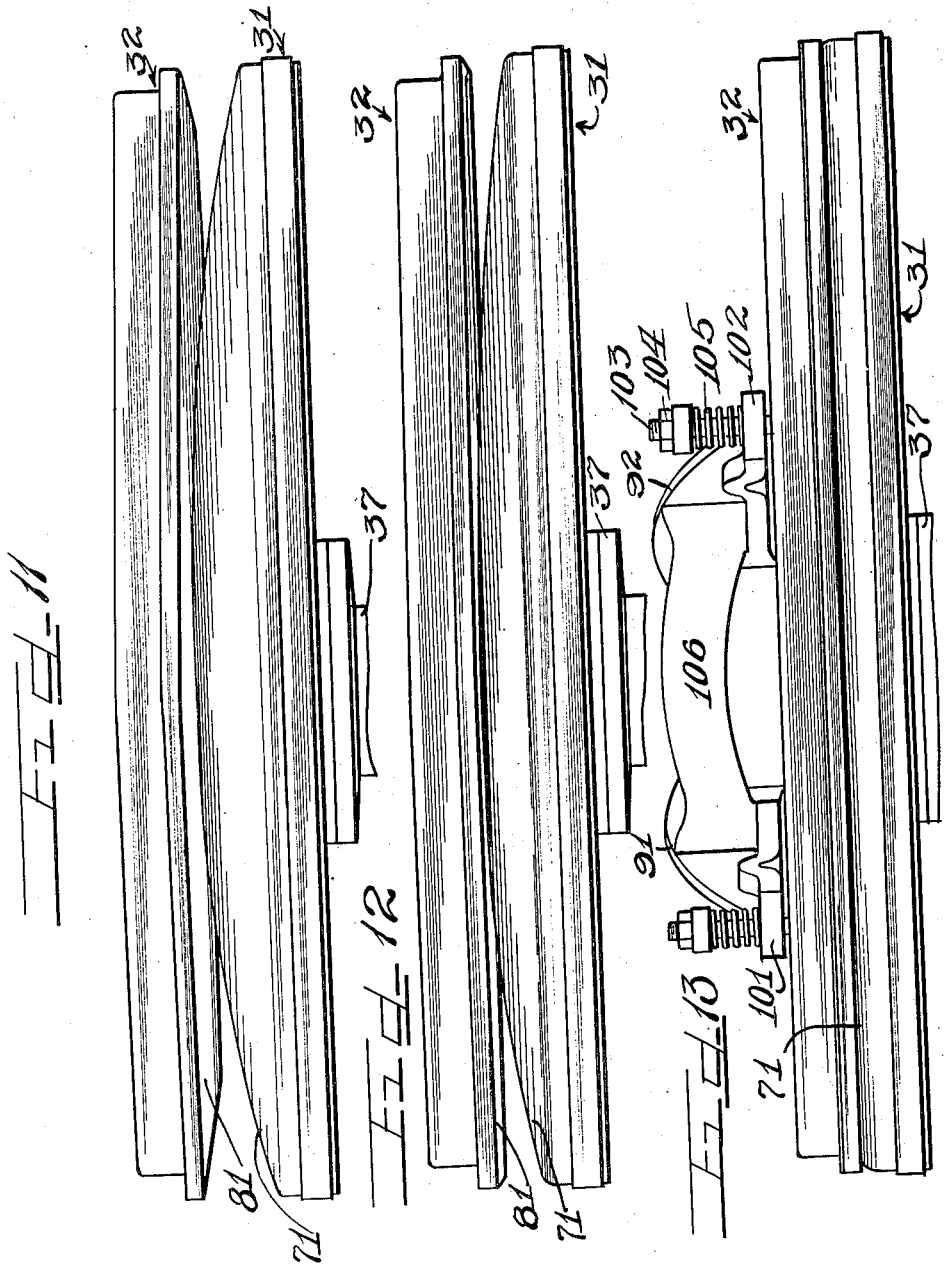

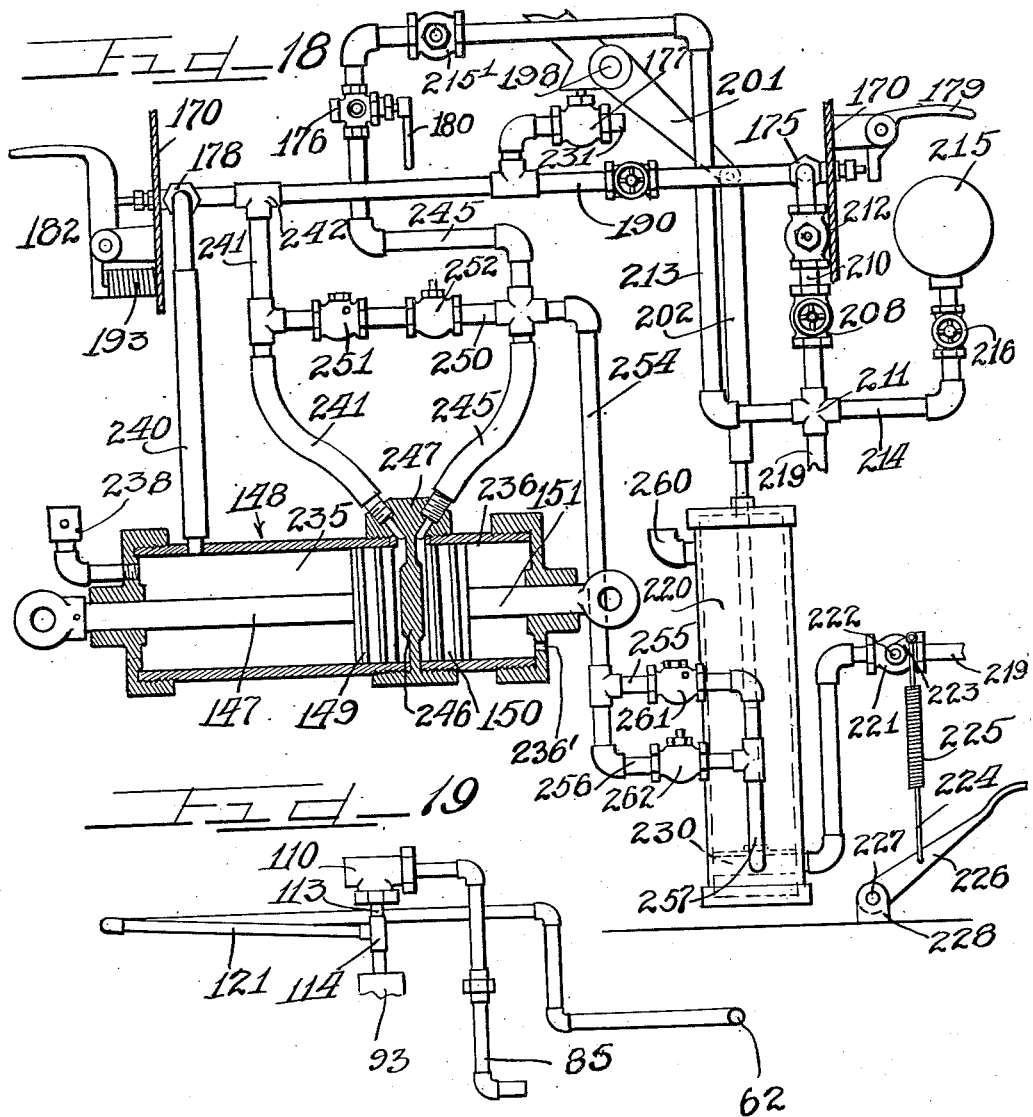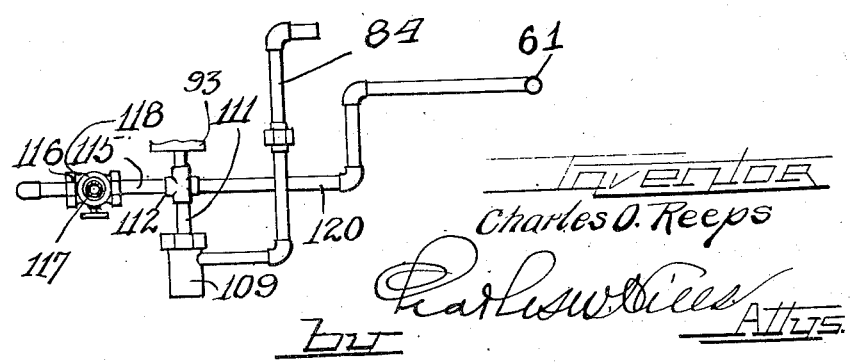

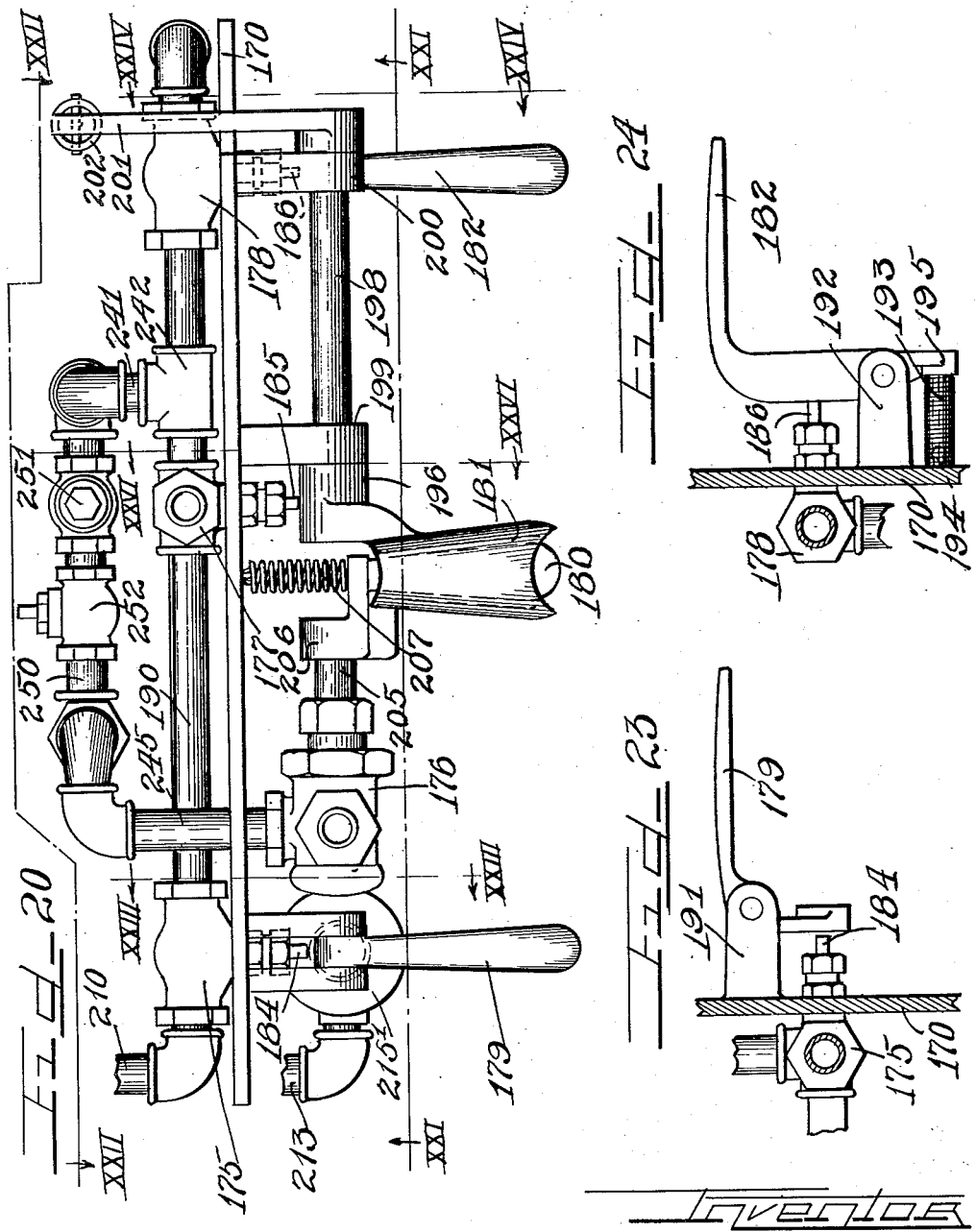

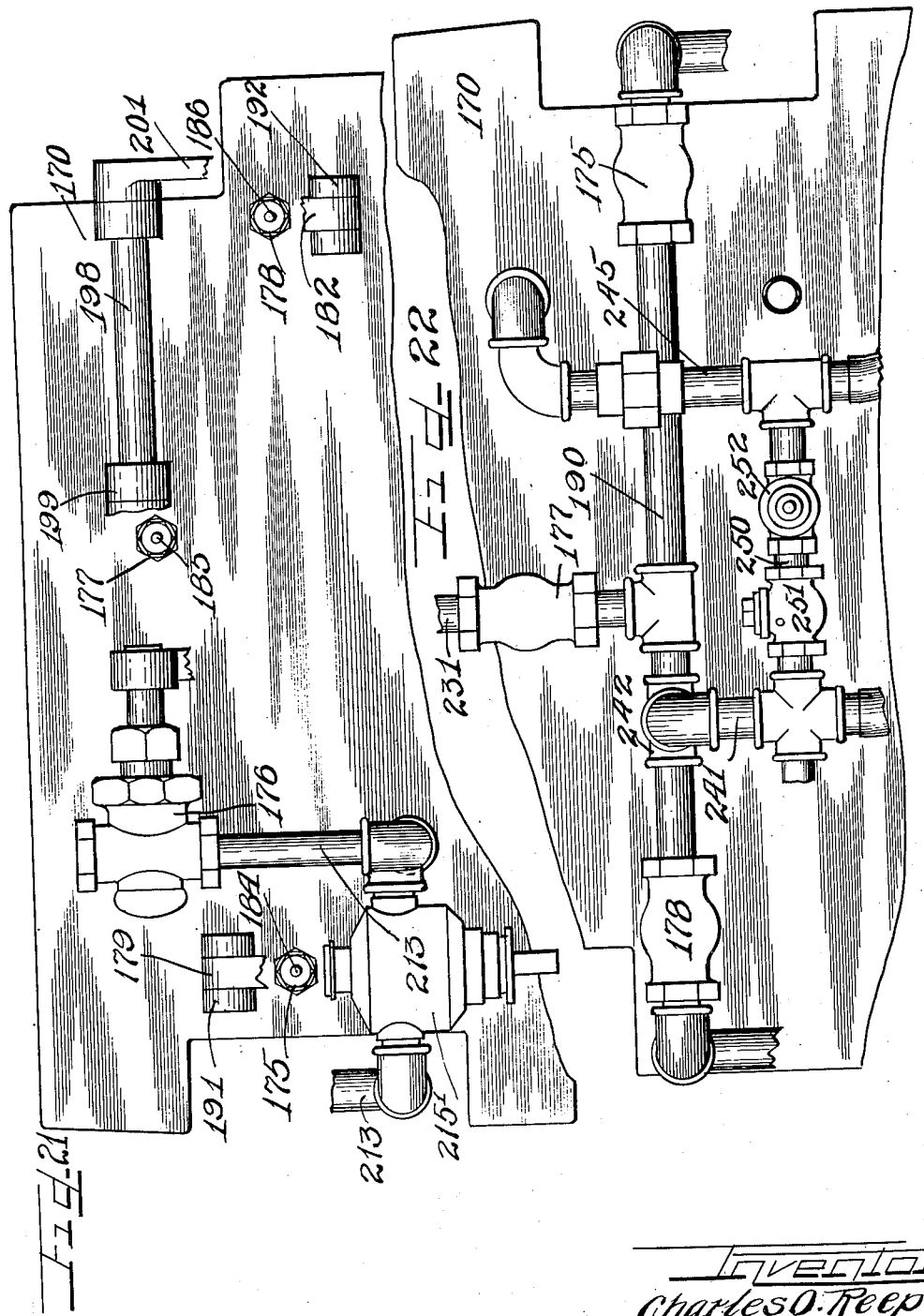

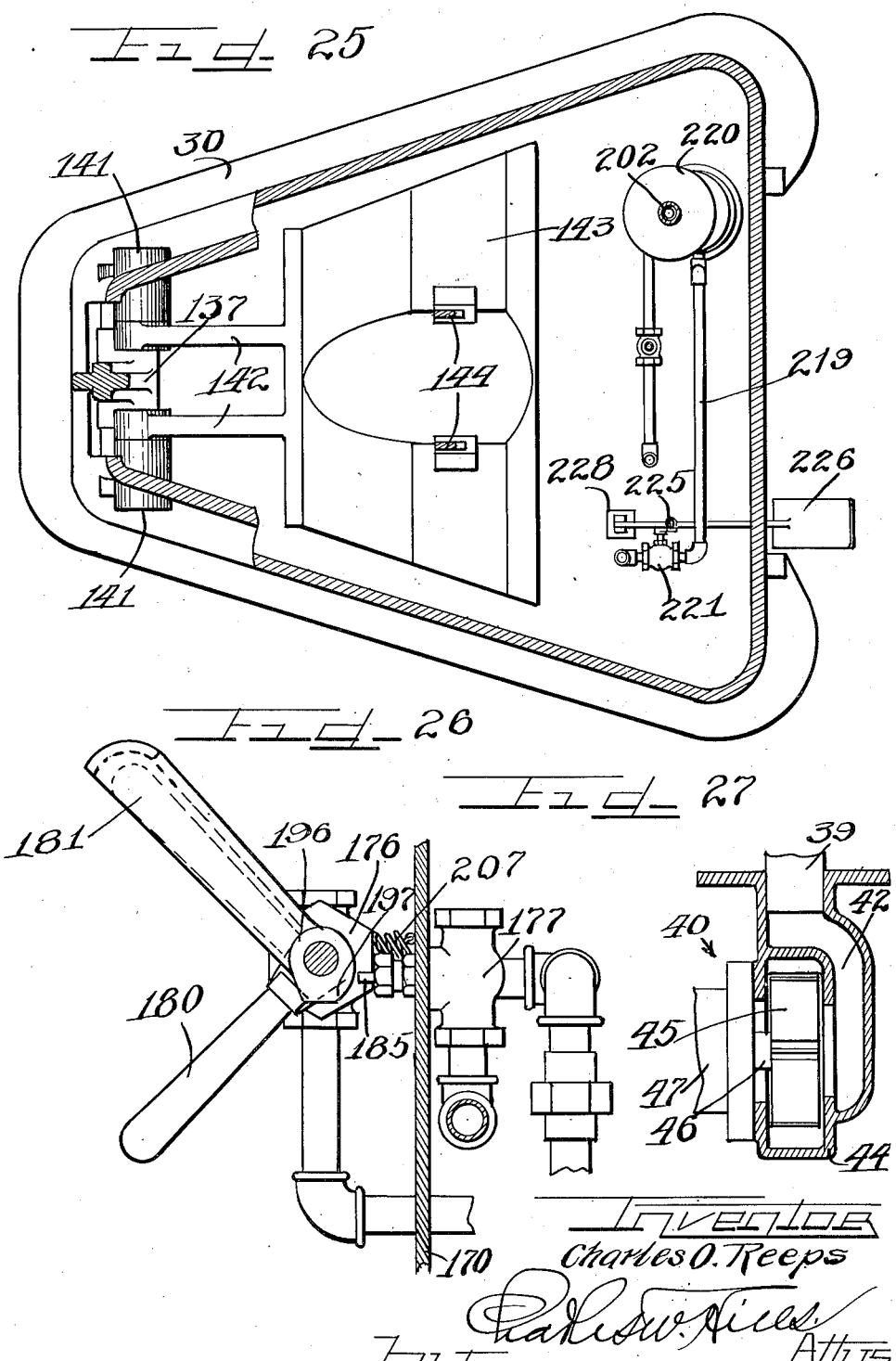

Patented July 12, 1932

1,867,173

UNITED STATES PATENT OFFICE

CHARLES O. REEPS, OF SYRACUSE, NEW YORK, ASSIGNOR TO NATIONAL LAUNDRY MACHINERY COMPANY, INC., OF SYRACUSE, NEW YORK, A CORPORATION OF DELAWARE

AUTOMATIC IRONING PRESS

Application filed August 16, 1929. Serial No. 386,339.

This invention relates to presses, and more particularly to an ironing press of the type disclosed in my copending patent application, Serial No. 286,805, filed June 20, 1928, and which embodies both an ironer and a drier.

At present the ironing presses are divided into two distinct classifications, namely ironers and tailoring presses. In the typical ironing machine the work being treated is subjected to an intense pressure and is in effect baked in order to remove the moisture therefrom. On the other hand, in the conventional type of tailoring press the article to be treated is first moistened by steam and then is subjected to a slight pressure in order to form the article upon the stationary buck, and to thereby bring the article or goods back to life.

I have found that the conventional method of ironing an article in a press, namely, to bake it under heavy pressure, is extremely detrimental to the longevity of the fabric being treated as well as to the life of the padding on the bed of the press. The intense pressure and heat to which the article is subjected in the conventional ironer results in the flattening of the fabric thus crushing and killing the organic matter comprising the same which for example might be wool or silk, as the case may be, and thereby results in the fabric or article shrinking and becoming hardened. As a result the fabric is caused to lose its life, becoming dead to look at and so could be likened to a rug on which the nap has become flattened due to long usage without cleaning. For example, if an article such as a woolen sweater were to be treated in a conventional ironing machine the intense pressure and heat would crush the wool, shrink it and kill the life of it thus rendering it short lived and unusable.

In both the ironer and conventional tailoring press the moisture of the article being handled is driven into the padding of the bed rotting it and destroying its life. This rotting of the padding necessitates that it be frequently changed thereby adding to the upkeep and overhead of these machines. From experiments which I have conducted in this connection I find that the ordinary type of article handled in an ironing machine contains an average of 42% moisture when placed between the head and bed of the press. Heretofore practically all of this moisture has been forced into the padding of the bed and hence it is no wonder that the padding has been short lived.

Another disadvantage of the conventional ironer and press resides in the fact that in the past whenever an article required more than one lay in the machine, or in other words more than one ironing operation thereon, the ironing of the first lay resulted in the moisture from the adjacent portion of the unironed part of the article being removed thus necessitating a subsequent moistening operation in order to complete the ironing of the article.

Obviously in the case of silks and woolens which have been washed it is desirable that they be dried rather than ironed. It is for this reason that it has heretofore been impractical to handle articles of this type in the conventional ironer. Should a silk article be placed in the conventional ironer it would become wrinkled, hard and at the same time would be discolored. I find that by drying a silk or woolen article instead of pressing it the article does not become discolored or wrinkled and leaves the machine in a soft and flimsy condition. The drying of woolen articles prevents their shrinkage which is the biggest difficulty encountered in the ironing of such goods.

I propose to provide an improved combination ironer and drier of the same general type as that disclosed in my previously mentioned copending patent application which is designed to handle all types of washed goods to be ironed or dried irrespective of whether they are of cotton, imitation silk, silk or wool.

It is also an object of the invention to provide a press for drying and ironing articles on a ballooned padding formed by a cushion of air consisting of heated air circulated under the padding at a high speed and of a volume which is predetermined to take into account leakage of air through the pores of the padding.

Another object of the invention is to maintain a heated cushion of circulating air under the padding of a press buck of high enough temperature to cause any moisture coming into contact with the padding during the operation of the press to be immediately vaporized so as to enable such vapor to escape laterally from the press or to be entrained in the circulating mass of air thus preventing such moisture from being soaked into the padding.

Still another object of the invention resides in the provision of a press for ironing and drying articles wherein a constant circulation of intensely heated air is maintained under the padding for a twofold purpose, one being for the treating of the article being handled by the machine and the other being to maintain the padding soft and heated to a sufficient extent as to prevent moisture of the article from settling therein.

A further object of the invention is to provide a new process of ironing articles which consists primarily in ballooning the padding upon which the article is laid with heated air, circulating the heated air at a rate sufficiently rapid to take into account penetration of the padding by the air being circulated, and forming the ballooned article on the padding against a heated head without the application of any intense pressure thereto.

A still further object of the invention is to provide a combination ironer and drier wherein the moisture of the article being treated is forced laterally from the press in the form of a fog which serves to prevent the drying of the unironed parts or lays of the article adjacent to the part being treated.

Another and further object of the invention resides in the provision of a novel process of drying and ironing an article which consists in subjecting the article to heat on a cushion of air without the application of intense pressure thereto and causing moisture in the article to escape from the article in the form of a vapor thereby preventing such moisture from being first driven into the padding of the ironing buck.

Heretofore due to the fact that most articles contain an average of 42% moisture, considerable energy of the press was spent in driving the moisture from the article thus hardening the padding as previously pointed out and shortening the life of the article. In the machine of my invention due to the fact that I do not drive the moisture from the article into the padding but instead form the article against the heated head by the means of an intensely heated cushion of air which prevents moisture from penetrating the padding since any moisture coming into contact with the padding is vaporized I am able to very greatly increase the efficiency of the machine over that of the conventional press or ironer.

A further object of the invention resides in the provision of a process of and press for ironing and drying articles wherein the article is subjected on one side to a heated cushion of air adapted to have imbedded in it any irregularities in the article such for example as buttons or the like whereby any possibility of damaging the article while in the press is reduced to a minimum. The press of my invention will not flatten or break buttons nor will it flatten any other irregularities in the article such for example as tassels, embroidery work, etc.

Another object of my invention is to provide a process of and an apparatus for ironing and drying articles which does not require the daily changing of the padding of the press and which enables the constant use of the padding for relatively long periods of time.

Still another object of the invention is to provide a method of and an apparatus for drying and ironing articles which treats it in such a way as to cause it to leave the machine or press in its natural condition, soft, lustrous, flimsy and pleasing to the eye.

A further object of my invention is to provide a method of and an apparatus for drying and ironing articles with much less pressure than has been required heretofore and hence with much less expense.

A further object of this invention is to provide an improved control system for ironing and drying presses wherein the accident hazard is reduced to a minimum.

Heretofore in a great many of the ironing machines in use magnetic controls were employed to effect an intense pressure within the machine. These controls however proved to be hazardous and ineffective and as a result caused many unnecessary accidents. A great many of these accidents occurred due to the magnets becoming surfaced with the moisture present in the laundry room and as a result failing to operate. The failure of these controls in turn caused the heads of the machines or presses associated therewith to fall upon the hand or hands of the operators.

Later on in this industry the so-called two hand control was developed. By this control system the operator of the press was required to use both hands on control members in order to effect the operation of the press. The idea of this control being that the operator could not place her hands between the ironing members. This control system was not foolproof for the reason that frequently two girls would work at the same machine and one of the girls could place her hands between the members to hold the article on the bed while the other manipulated the controls and hence an accident could be had despite the two hand control.

I propose to provide an apparatus for ironing and drying articles wherein the head is at all times positively counterweighted so that even should the air pressure fail it would still return to its uppermost position without any damage or injury to the operator.

Another and further object of the invention resides in the provision of a press wherein the movable member is initially lowered into proximity with and spaced from the bed without the application of any pressure thereto and wherein the bed is ballooned by circulating heated air against the head so that even in the event the operator does get her hand between the head and bed of the press it will not be crushed and at most would only be burned.

I also aim to provide a novel two hand control system for effecting the lowering of the head into cooperation with the ballooned bed whereby the operator must use both of her hands to operate the press before the application of pressure to the head.

Still another and further object of the invention is to provide a novel method of and apparatus for drying and ironing articles whereby the article may be initially formed against a heated member by a heated cushion of air without the application of pressure thereto and in such a way that moisture is removed from the article and vaporized so as to escape from the press and whereby at the operator's will the article may be subsequently pressed as the case may require.

In accordance with the general features of my invention I provide a drying and ironing press comprising a bed and a movable heated head cooperable therewith, means for creating a circulation of heated air under the padding of the bed so as to balloon the padding during a moisture removing operation, means for lowering the head into proximity with and spaced from the ballooned bed to aid in the moisture removing operation and means operable at the will of the operator for subsequently applying pressure to the head to press the article on the bed whenever the nature of the article being treated requires such an operation.

Another feature of the invention resides in the provision of a control system for effecting operation of the press comprising two manually operable valves for lowering the head into cooperation with the bed and an additional valve member operable by the operator thereafter to apply pressure to the head as well as timed means for automatically limiting the pressure operation and to enable the head to be moved to its original position after the elapse of a given period of time.

Other objects and advantages of my invention will more fully appear from the following detailed description taken in connection with the accompanying drawings which illustrate a single embodiment thereof and in which:

Figure 1 is a front elevation of my novel combination ironing and drying press showing the ironing head in its raised or elevated position.

Figure 2 is a plan view of the machine.

Figure 3 is an enlarged fragmentary rear view of the machine.

Figure 4 is a fragmentary side elevation of the machine illustrating in dotted lines various positions of the mechanism associated with the ironing head.

Figure 5 is an enlarged fragmentary sectional view taken on the line V—V of Figure 6 looking in the direction indicated by the arrows.

Figure 6 is an enlarged fragmentary sectional view partly in elevation taken on the line VI—VI of Figure 2 looking in the direction indicated by the arrows.

Figure 7 is a plan view of the stationary ironing buck partly broken away in order to show the arrangement of the steam heating coil therein.

Figure 8 is an enlarged sectional view taken on the line VIII—VIII of Figure 7 looking in the direction indicated by the arrows.

Figure 9 is an enlarged sectional view of the ironing head illustrating in detail the arrangement of the baffle elements therein for directing the passage of steam through the head.

Figure 10 is a sectional view of the ironing head taken on the line X—X of Figure 9 looking in the direction indicated by the arrows.

Figure 11 is an enlarged view of the ironing members of the press showing their relative positions during my so-called ballooning operation and prior to the pressing of the ironing head into engagement with the buck.

Figure 12 is a view similar to Figure 11 of the ironing member showing the position of these parts after a slight application of pressure to the ironing head.

Figure 13 is an elevation of the ironing members when they are pressed into tight cooperation during the so-called pressure operation.

Figure 14 is a fragmentary side elevation of the ironing members as shown in Figure 11 and clearly illustrates the arrangement of these ironing members during the so-called ballooning operation.

Figure 15 is a view similar to Figure 14 showing the application of pressure to the ironing head and illustrating the arrangement of the ironing members just prior to the final pressure operation.

Figure 16 is an enlarged fragmentary sectional view taken through a portion of the stationary buck during the ballooning operation shown in Figure 14 and illustrating the manner in which the upper layers of material on the stationary buck are ballooned outwardly by the air circulating therethrough.

Figure 17 is an enlarged fragmentary plan view of a corner of the stationary buck illustrating the various layers of material going to make up the padding on this buck.

Figure 18 is a diagrammatic view partly in section of the air pressure operated system for controlling the movement of the ironing head into cooperation with the stationary buck.

Figure 19 is an enlarged plan view of the piping shown in Figure 2 used to circulate steam through the movable ironing head and the buck.

Figure 20 is an enlarged plan view of the mechanism on the control panel in the front of the machine taken on substantially the line XX—XX of Figure 6 looking downwardly, the outer cover for this mechanism being removed in order to more clearly show the parts.

Figure 21 is a fragmentary front view of the panel shown in Figure 20 taken on substantially the line XXI—XXI of Figure 20.

Figure 22 is a rear view of the valve mechanism connected to the control panel taken on substantially the line XXII—XXII of Figure 20 looking in the direction indicated by the arrows.

Figure 23 is a fragmentary sectional view taken on the line XXIII—XXIII of Figure 20 looking in the direction indicated by the arrows and illustrating the construction of one of the manually operable control valves.

Figure 24 is a fragmentary sectional view taken on the line XXIV—XXIV of Figure 20 looking in the direction indicated by the arrows and illustrating in detail the construction of another of the manually operable control valves.

Figure 25 is a sectional plan view taken on the line XXV—XXV of Figure 6 looking in the direction indicated by the arrows.

Figure 26 is a fragmentary sectional view taken on the line XXVI—XXVI of Figure 20 looking in the direction indicated by the arrows and showing in detail the construction of the manually operable valve mechanism for controlling the application of pressure to the ironing head.

Figure 27 is a fragmentary sectional view taken on the line XXVII—XXVII of Figure 6 looking in the direction indicated by the arrows and illustrating the construction of the blower.

As shown on the drawings:

The machine as best shown in Figure 1 includes a stand or base 30 of a hollow metallic construction which has supported thereon cooperable ironing members comprising a stationary buck 31 and a movable ironing head 32. Supported upon the top of the base 30 and disposed below the stationary buck 31 is a trough-like pan 33 which may be made of any suitable material such, for example, as sheet metal. This pan is designed to support the ends of the article being ironed and has secured to its under side a metal compartment 34 adapted to receive goods to be moistened and an ironing board compartment 35 adapted to receive a small ironing board upon which special parts of articles of clothing may be ironed by hand. Both of the compartments 34 and 35 are disposed at the ends of the pan 33 and may be made of sheet metal. Also suspended from the compartment 35 is a sheet metal box 36 designed to accommodate and house a small portable electric hand iron for use in connection with the ironing board in compartment 35. It is of course to be understood that the metallic compartments 34, 35 and 36 can be omitted from the machine or press without in any way deviating from the features of my present invention.

The stationary buck 31 (Figure 6) is supported upon a tubular flanged column 37 suitably attached to the top of the base 30. Extending through this tubular column 37 are two tubes 38 and 39 which lead to the pressure and suction sides respectively of a conventional blower 40 fastened to the under side of the top of the base 30. The blower 40 (Figure 27) has an offset inlet or suction passageway 42 disposed in communication with the tube 39. The outlet or discharge opening 43 of this blower is disposed in communication with tube 38 (Figures 6 and 7) and is located radially of the rotor chamber 44 of the blower in which is disposed a rotor 45 mounted upon a shaft 46 actuated by a motor 47 (Figure 5) from which extends a flexible conduit 48 (Figure 6) containing electrical conductors leading to an electrical control switch 50 which will be more fully described hereinafter. The purpose of this switch is to control the opening and closing of the motor circuit so as to control the operation of the blower in accordance with the position of the ironing head 32.

The blower 40 is arranged to force air into a central portion of the stationary buck 31 and to suck air from a peripheral portion of the buck 31 so as to set up a constant circulation of heated air within the buck. I shall now proceed to describe in detail the construction of the buck.

The lower or stationary buck 31 comprises a metallic casing 51 which may be made of any suitable metal and is shaped similar to an ironing board as shown in Figs. 7 and 8. The central portion of this casing 51 has connected to it the tubes 38 and 39. The upper end of the tube 38 is disposed in communication with an opening 52 formed in the lower portion of the casing 51 and arranged to discharge air directly into the central portion of the buck. The other tube 39 is disposed in communication with an opening 53 in the casing 51 arranged to suck air from diametrically opposite passageways 54—54 having their outer ends in communication with a peripheral chamber 55 extending clear around the periphery of the buck 31 (Figures 7 and 8) and shaped to conform with the configuration of the buck. The central air chamber 56 of the stationary buck is separated from the peripheral chamber 55 by means of a wall 57 which cooperates with the rim of the casing 51 to define the chamber 55. This arrangement of the two chambers 56 and 55 enables air to be forced into the chamber 56 and to be sucked back into the peripheral chamber 55 by the suction of the blower 40. The purpose of this circulating stream of air will be more fully explained hereinafter.

The bottom 58 of chamber 56 has connected thereto a plurality of baffles 59 upon which is supported a steam coil. The ends of this steam coil 60 are located at the center of the buck as shown in Figure 7 and extend downwardly for connection with steam pipes to be hereinafter described. The ends of the coil 60 are designated by the reference characters 61 and 62 respectively.

Secured to the top of the casing 51 is a perforated plate 64 having smaller perforations 65 disposed over the chamber 56 and larger perforations 66 disposed about its peripheral portion and arranged to be in communication with the peripheral chamber 55 of the buck.

Disposed on top of the perforated plate 64 and enveloping the sides of the buck casing or housing 51 is a padding which comprises an outer layer of muslin 71, a layer of felt 72, disposed directly under the muslin, and three layers 73, 74 and 75 of a suitable highly porous fabric (Figs. 16 and 17). This padding is held in place on the stationary buck by means of clamp frame 76 (Fig. 8) formed to fit tightly about the outer periphery of the stationary buck.

The two outer layers of padding, namely, the layer of muslin 71 and felt layer 72, are adapted to be ballooned outwardly (Figure 16) by air circulated through the perforations 65 in the plate 64 and through the padding into the peripheral perforations 66 (Figure 8). This ballooning operation which is one of the most important features of my invention will be more fully explained hereinafter.

Positioned over and cooperating with the stationary buck 31 is a movable ironing head 32 which will now be described in detail. This ironing head, as best shown in Figures 9 and 10, comprises a metal casting 80 having a highly polished ironing face 81 on its lower surface and having mounted on its upper surface a covering of asbestos 82 held in place by a metal plate 83 (Fig. 10) shaped to conform with the configuration of the ironing head. The metal casting is formed hollow so as to permit of the passage of a heating fluid such as steam therethrough. Steam is admitted into the interior of this ironing head through inlet pipe 84 and leaves the hollow ironing head through an outlet or discharge pipe 85. The steam is caused to follow a tortuous passage through the ironing head by means of a plurality of baffle elements 86, 87, 88, 89 and 90 formed integral with the casting 80 (Fig. 9). These baffle elements insure a uniform heating of the entire head by the steam flowing through the head.

The head 32 is supported by a pair of spaced lever arms 92 and 92. The intermediate portion of each of these arms is pivotally mounted on a pin 93 (Figs. 2 and 6) pivotally carried by a hub portion 94 formed integral with an extension 95 of the base 30.

It will be noted from Figure 2 that the arms 92 and 92 converge rearwardly of the press and have their rear ends provided with tubular bearing portions 97–98 respectively, which bearing portions are pivotally mounted upon a pin 99 (Figs. 4 and 6). Positioned between the bearing portions 97 and 98 and pivotally carried by the pin 99 (Figure 3) is a link 100 which will be more fully explained hereinafter in connection with the toggle mechanism for raising and lowering the ironing head into and out of cooperation with the stationary buck.

The other ends of lever arms 92 and 92 are provided with bracket portions 101 and 102 which are resiliently held in contact and connected to the top of the ironing head 32 by means of bolts 103, nuts 104 and intermediate springs 105. The springs 105 surround the shanks of the bolts 103 and serve to force the bracket portions 101–102 into cooperation with the top of the ironing head. Each of the bracket portions 101 is offset upwardly as best shown in Figure 14 in order to provide a downwardly extending fulcrum projection 96 designed to fit into the space between a pair of spaced upwardly extending lugs 96' on the top of the ironing head 32. This arrangement insures that the head 32 will be properly aligned with the brackets 101 and 102 on the arms 92 and 92 and also permits of the head having a pivotal action about the fulcrum projections 96. The springs 105 serve to enable the ironing head to adjust itself to the top of the stationary buck during the pressure stroke or operation of my press. The two arms 92 and 92 are connected adjacent the brackets 101–102 by means of an intermediate bar 106 (Figure 2) which causes these arms to move as one during the raising and lowering of the ironing head.

The steam pipes 84 and 85 for letting steam into the ironing head 32 (Figure 19) are connected to swinging pipe joints 109–110, respectively, which allow the pipes 84 and 85 to swing with the ironing head during the movement of the latter. The swinging joint 109 is connected by a pipe 111 to the pipe—T 112 and the swinging joint 110 is connected by a pipe 113 to a pipe—T 114. The two T's and joints are disposed in axial alignment with the axis of pin 93 so that the swinging pipe joints 109 and 110 swing about the same axis as that of the arms 92 and 92 carrying the ironing head (Figs. 2 and 3).

Extending rearwardly from the T 112 is a pipe line 115 having a T 116 which is connected to an upwardly extending steam supply pipe 117 which supplies steam for the heating of both the ironing members of my press, as will become more apparent with the progress of the present description. The steam supply to the ironing members from pipe 117 may be controlled by the hand valve 118 connected to this pipe 117 (Figure 3). Connected to the pipe 115 and extending downwardly therefrom is a pipe 120 which is connected to inlet pipe 61 of the stationary buck 31 (Figs. 3, 7 and 19).

The T 114 (Figure 19) is connected to a rearwardly extending steam pipe 121 which is in turn connected to a downwardly extending pipe 122 (Figure 3) connected at its lower end to a T 123 which is in turn connected to an outlet end 62 of the steam coil within the stationary ironing buck 31. The T 123 also has connected to it a steam discharge or return pipe 124 which carries the dissipated steam away from both the ironing members.

I shall now proceed to describe in detail the toggle mechanism for moving the ironing head 32. As previously described, the link 100 is connected to the pivot pin 99 at the rear extremity of the spaced arms 92 and 92 and is designed to move these arms about the axis of pin 93 for the purpose of raising and lowering the ironing head. This link 100 (Figs. 3 and 6) comprises two spaced parts 131 and 132 connected by an adjustable turn buckle member 133 adapted to vary the over all length of the link 100. The lower part 132 is pivotally mounted on a pivot pin 134 between a pair of spaced downwardly converging arms 135 and 136 having their upper ends also pivotally mounted upon the pin 134. The lower portions of arms 135-136 (Figure 3) are formed integral and terminate in hub portion 137 pivotally mounted on a pin 138, suitably carried by the lower part of the base 30.

The arms 135-136 and the link 100 comprise a toggle for actuating the movable ironing head. This toggle extends through a vertical opening 140 in the rear of the standard or base 30.

Positioned directly above the pivot pin 138 is a pair of axially aligned pivot pins 141—141 also carried by the base 30 as is evident from Figures 3, 6 and 25. Pivotally connected to these pins 141—141 are the free ends of a pair of spaced arms 142—142 which have connected to them a counterweight 143 which is clearly shown in Figures 6 and 25. Pivotally secured to this counterweight are a pair of upwardly and outwardly extending spaced links 144—144 each of which has its upper end pivotally connected to a downwardly extending ear 145 secured to the bearing members 97 and 98 (Figs. 3 and 6). The purpose of this counterweight as will be more fully described in the operation of my press is to draw the rear ends of the arms 91 and 92 downwardly during periods of time when the press is not in use so as to maintain the ironing head clear of the stationary buck and in its uppermost position.

Connected to intermediate portions of the spaced arms 135-136 is a pivot pin 146 to which is pivotally connected one end of a piston rod 147 (Figure 6) extending into an air pressure cylinder 148 (Figures 3 and 6). This air cylinder 148 is disposed within the hollow base 30 and houses two aligned pistons 149 and 150 as shown in Figure 18. Piston 149 is connected to the rod 147 and the piston 150 is connected to a rod 151 having its free end pivotally connected to a pin 152 (Figure 6) carried by a bracket 153 secured to the front of base 30.

Before proceeding with the description of the air operated control mechanism for operating the toggle, I wish to draw attention to the fact that the motor 47 for actuating the blower 40 is controlled by the previously mentioned switch 50. This switch 50 is of the mercury type and is pivotally mounted upon a pin 155 connected to a bracket 156 (Figs. 2 and 6) which is fastened to the hub portion 94 between the spaced arms 91 and 92. Rigidly connected to the mercury switch 50 is a laterally extending lever arm 157 which carries a weight 158. This weight 158 is engageable by a spring arm 160 fastened to the upper part 131 of link 100 so that when the toggle is moved into its extended or uncollapsed position the switch is tilted due to the arm 160 striking the weight 158. This tilting of the switch 50 results in the closing of the motor circuit, thereby starting my so-called ballooning or drying operation. Upon the collapsing of the toggle the spring arm 160 is moved downwardly out of engagement with the weight 158 and the switch is then tilted into its open position by the gravitation of the weight 158 thus opening the motor circuit.

I shall now proceed to describe in detail the air pressure controlled system disclosed diagrammatically in Figure 18. In order to simplify my description of the air pressure controlled system of this press I have found it necessary to illustrate the system more or less diagrammatically in Figure 18. It is thought, however, that if this figure is considered in connection with Figures 5, 6, 20, 21, 22, 23, 24 and 26, the operation of this control system will be fully evident.

As best shown in Figures 1 and 6, the manually operable valve mechanism for this air pressure controlled system is disposed at the front of the machine and is mounted upon a panel 170 detachably secured to the front of the base 30. Also detachably secured to this panel 170 is a cap or cover 171 for enclosing the valve mechanism. This cover 171 is provided with three spaced openings 172, 173 and 174 (Figure 1) through which the handles of the manually operable valves extend.

The manually operable control valves comprise four (Figure 20) handle operated valves 175, 176, 177 and 178. These four valves are operable by handles 179, 180, 181 and 182. The handle 179 extends through opening 172, the handles 180 and 181 extend through the elongated vertical opening 173, and the handle 182 projects through the opening 174 in the cover 171.

The valves 175, 177 and 178 are provided with projecting plungers 184, 185 and 186 movable by the handles 179, 180 and 182. These projecting plungers are connected in the usual way to the movable valve elements for opening and closing the valves. That is to say, the valves 175, 177 and 178 are of conventional construction and the projecting plungers are of the outwardly spring-urged type.

The valve 175 as shown in Figures 18, 20 and 23 is in its closed position. Valve 177 as shown in Figs. 18, 20 and 26 is in its closed position. Valve 178 as shown in Figures 18, 20 and 24 is in its open position. It will also be noted that these three valves 175, 177 and 178 are connected to a common pipe 190 disposed directly behind the panel 170 (Figs. 18, 20 and 21).

The handle 179 for controlling the operation of valve 175 (Figure 23) comprises an angular element pivotally carried by a bracket 191 secured to the front of panel 170. Valve 175 is secured to the rear side of the panel 170 in such a way that its projecting plunger 184 is disposed in the path of movement of the vertical leg of the angular handle 179 so that when the horizontal part of this handle is moved downwardly the plunger 184 will be moved inwardly into the valve to open the valve.

The handle 182 for operating valve 178 also comprises an angular element having an intermediate portion of its vertical leg pivotally connected to a supporting bracket 192 (Fig. 24) fastened to the front of panel 170. The valve 178 is operable by handle 182 and is secured to the rear face of the panel 170 directly opposite the vertical leg of the handle so that the handle 182 will normally hold the plunger 186 in its depressed or innermost position for the purpose of maintaining the valve open.

The handle 182 is held in the position shown in Figure 24 by a spring 193 which surrounds a stud 194 secured to the front of panel 170. This spring is disposed between the panel and the lower end 195 of the vertical leg of the handle 182. This construction enables the compressed spring 193 to normally maintain the handle 182 in engagement with the plunger 186 to maintain the valve 178 open.

The handle 181 for moving plunger 185 of valve 177 inwardly into the valve housing to open the valve comprises a hollow member of arcuate cross section adapted to actuate the handle 180 as shown in dotted lines in Figure 26. It will, of course, be obvious that the two handles 180 and 181 are mounted to move about a common axis. The handle 181 is secured to a hub 196 (Figs. 20 and 26) which has formed integral with it a cam portion 197 adapted to be moved into engagement with the plunger 185 to open valve 177. This hub 196 is secured to one end of a rotatable shaft 198 journalled in brackets 199 and 200 secured to the front face of the panel 170.

The other end of shaft 198 has secured to it an arm 201 which extends inwardly through a suitable opening in the panel 170 and has its inner end pivotally connected to the upper end of a timer piston rod 202 which will be more fully explained hereinafter, (Figs. 5 and 18).

Positioned in axial alignment with shaft 198 is the rotary actuating element 205 of valve 176. This element is adapted to be rotated to open and close valve 176 and it is operable by handle 180 provided with hub portion 206 secured to the outer end of element 205. The handle 180 is arranged to be snapped into either opened or closed positions by means of a spring 207 fastened at one end to the front of panel 170 and at the other end to handle 180. This spring serves to prevent the handle element 180 from being in neutral position. Also when the handle 180 is operated it tends to force it in the direction in which the handle is moving once the handle is past a predetermined center line. For example, in Figure 26 the handle is urged into its lowermost position, in which position the valve 176 is closed. In order to open the valve 176 the attendant or operator moves the handle 180 upwardly and once this handle is past the center line it is urged up into the dotted line position shown in Figure 26. The moving of the handle 180 to the dotted line position results in the rotation of the valve member 205 thus opening valve 176.

If thereafter the handle 181 be operated it will move the handle 180 in a downward path thus opening valve 177 and closing valve 176.

Obviously this handle member 181 may be actuated manually or may be actuated by the shaft 198 through the operation of the timer as will be more fully explained hereinafter.

As best shown in the diagrammatic view in Figure 18, the valve 175 is connected by a pipe line 210 to one side of a four-way pipe joint 211. Disposed in this pipe line 210 is a conventional pressure regulating valve 212 and a hand valve 208. The valve 176 is connected by a pipe line 213 to another side of the joint 211 and a third side of the joint 211 is connected by a pipe line 214 to a supply tank of compressed air 215. Disposed in the pipe line 213 adjacent valve 176, as best shown in Figs. 18, 20 and 21, is a regulating valve 215' for controlling the high pressure fluid applied to the pistons 149 and 150 on the pressure stroke of the press. Disposed in the pipe line 214 is a conventional hand valve 216. Referring to Figure 3, it will be noted that the supply of air in the tank 215 is supplemented by that in a tank 217 connected by a U-shaped pipe line 218 to the first tank 215. Both tanks are disposed on the sides of the base 30 directly under the pan 33.

The fourth side of the joint 211 is connected by a pipe 219 to the timer cylinder 220. Disposed in this pipe line 219 is a conventional valve 221 (Figure 18) having a rotary valve element 222 operable by a lever arm 223 secured thereto. The free end of the lever arm 223 is connected by a link 224, including a tension spring 225, to a treadle 226 pivotally connected to a pivot pin 227 (Figure 5) and suitably carried by a bracket 228 which may be secured to the floor directly beneath base 30.

The valve 221 comprises an emergency valve which the operator may quickly open by merely depressing the treadle 226 thus causing air to flow directly from the supply tanks to the timer cylinder to actuate the timer piston 230 upwardly within the cylinder thereby moving rod 202 upwardly, rotating shaft 198 and opening valve 177 (Figure 18). The opening of this valve results in the air within the pressure cylinder 148 escaping into the atmosphere in view of the fact that the one side of the valve 177, as indicated at 231 is open to the atmosphere.

I shall now proceed to describe the connections between the cylinder 148 and the control valves. The cylinder 148 (Figure 18) comprises two piston chambers 235 and 236 in which are disposed the separately reciprocable pistons 149 and 150. One end of the piston chamber 235 has connected to it a vent valve 238 for permitting of the displacement of the air within this cylinder chamber 235 when the piston 149 is moved to the left in Figure 18, and chamber 236 has a vent 236' for permitting relative displacement of the cylinder and the piston 150. Also connected to this same end of this cylinder chamber 235 is one end of a pipe line 240 the other end of which is connected to the discharge side of valve 178. The other end of the chamber 235 has connected to it one end of pipe line 241, the upper end of which is connected to pipe 190 by means of a T 242.

The chamber 236 has connected to it one end of a pipe line 245 positioned to allow air to enter the cylinder 236 adjacent the partition wall 246 for the purpose of moving the entire cylinder 148 bodily on the piston 150 as will be more fully explained in the description of the operation of my press. The other end of the pipe line 245 is connected to the discharge side of valve 176.

The two pipe lines 240, 241 and 245 should in part comprise flexible pipe sections as is evident from Figure 18 so as to permit of the movement of the cylinder previously mentioned.

The two pipe lines 241 and 245 are connected to a coupling sleeve 247 which not only serves to couple the two parts of cylinder 148 together but also has formed integral with it the previously mentioned partition wall 246.

Connected across the pipe lines 241 and 245 is a pipe line 250 which includes a check valve 251 and a reducing or needle valve 252. The purpose of these two valves will be explained hereinafter.

Also connected to the pipe line 250 is a downwardly extending pipe line 254 which has its lower end disposed in communication with the two parallel pipe lines 255 and 256 connected to the upper end of a pipe line 257 which has its lower end in communication with the interior of the timer cylinder 220 below the piston 230. The upper end of the timer cylinder 220 has connected to it a vent 260 for allowing the displaced air to escape as the timer piston is moved upwardly in the timer cylinder 220.

The pipe line 255 includes a check valve 261 and the pipe line 256 includes a needle valve 262 for purposes to be explained more in detail hereinafter.

The operation of my press is as follows:
Assuming the ironing head 32 is in its uppermost position as shown in Figure 1, the operator places the article or lay of goods to be ironed upon the stationary buck preparatory to the ballooning operation. Then the operator places a hand on handle 179 and moves it downwardly thus opening valve 175 and allowing compressed air to pass from the supply tank 215 through pipes 214, 210, 190 and 241 (Figure 18) into the pressure cylinder chamber 235 adjacent the partition wall 246. This air, however, does not immediately force the piston rod 147 outwardly for the reason that compressed air also travels through the normally open valve 178 into the chamber 235 on the other side of the piston 149 thus checking the piston movement. Obviously this checking of the piston movement also results in the checking of the ironing head 32 against sudden movement inasmuch as the piston and ironing head are connected together through a toggle.

It therefore then becomes necessary for the operator to place her other hand on the handle 182 of valve 178 so as to close this valve and shut off the supply of air from the pipe 240. Piston 149 can then properly move under the effect of the compressed air entering the chamber 235 from pipe line 241 thus causing piston rod 147 to partially expand the toggle causing the ironing head 32 to be lowered to the intermediate position shown in Figures 11 and 14. It will, of course, be evident that in order for this outward movement of the piston rod 147 to be completed the operator must hold the two valve handles 179 and 182 depressed after the piston closes or passes the inlet from pipe 240, all of the air pressure will then be on one side of the piston 149 and the operator may then release the two valve handles 179–182. This arrangement is highly desirable since it precludes any possibility of the operator getting her hands between the ironing members during the lowering of the ironing head into cooperation with the buck.

The lowering of the ironing head 32 results in the closing of the mercury switch 50 thus closing the motor circuit and setting the blower into operation to circulate air through the heated buck 31. This heated air is of sufficient volume and is circulated at a high enough rate to take into account leakage through the pores of the muslin 71 of the padding on the buck so that irrespective of such losses the top layers of the padding will be ballooned by a cushion of air as shown in Figures 11, 14 and 16. This cushion of air is naturally resilient and forces the article into contact with the heated surface 81 of the ironing head 32. Any irregularities in the article being ironed such for example as buttons will imbed themselves in the padding due to the fact that the padding is urged upwardly by a resilient cushion of air, and hence the buttons and the lay will not in any way be damaged.

In the case of fine work such, for example, as embroidery, the ballooning operation of my press enables the ironing of the embroidery pieces without flattening out the embroidery work. In fact, the pieces leave my press in a soft condition so that the embroidery work is in effect raised and not hardened.

In the case of silks and woolen articles I find that this ballooning operation is sufficient to press and iron both sides of the articles without the necessity of any further pressure being applied to the articles. However, in the case of other classes of goods such, for example, as flat work it is desirable to apply a greater pressure to the article. In such cases the operator, after the ballooning operation, actuates valve handle 180 so as to move it from its lowermost position to the dotted line position shown in Figure 26. This movement of the handle opens valve 176. The opening of valve 176 permits air to pass from the tank 215 into the other chamber 236 against the head of the piston 150.

The air entering the chamber 236 has a higher pressure than that allowed to enter the chamber 235, this being determined by proper adjustment of the pressure reducing valves 212 and 215'. Obviously, therefore, upon the introduction of high pressure air into the chamber 236 the entire cylinder 148 will bodily slide rearwardly over the anchored piston 150 due to the fact that chamber 235 is filled with air of a lower pressure than that in the cylinder 236. This movement of the cylinder is transmitted by the low pressure air in the chamber 235 against the piston 149 and the toggle is therefore further expanded and the ironing head is swung down against the buck. The resistance of the head to pressure engagement against the buck may cause the piston 149 to recede a distance in cylinder 235 but it will be noted that, by way of needle valve 252 and the check valve 251, the high pressure air gradually finds its way into the cylinder 235 so that after the cylinder body has been shifted the high pressure in chamber 235 will shift the piston 149 to the end of the cylinder and the ironing head will then be applied with final ironing pressure to the buck. The toggle is never fully expanded or straightened in order that, when the cylinder chambers are vented, the weight 143 may function to swing the head back to its normal upper position and to collapse the toggle.

When the valve 176 is opened high pressure air also passes from the pipe line 245 to pipe line 254 and through needle valve 262 into the lower part of the timing cylinder 220 thus gradually raising the piston 230 within the cylinder. This movement of the piston is transmitted to shaft 198 through the link 202 and arm 201 and handle 181 will therefore be swung down and the handle 180 will be swung down therewith for actuation of the valves 176 and 177. However, as soon as handle 180 passes its neutral position the spring 207 will rapidly swing it to its lower position (Figure 26) so that the valve 176 is closed to disconnect the air from the cylinder before the valve 177 is opened.

Upon opening of the vent valve 177 the air will immediately escape from the cylinders 235 and 236 through the pipes connected thereto into the pipe line 190 and from there into the atmosphere through valve 177. The compressed air within the timing cylinder 220 will leave this cylinder through the check valve 261 instead of the needle valve so that the air can be displaced quickly from the timing chamber. It will, of course, be evident that the needle valve 262 is adjusted to regulate the amount of air allowed to enter the timing cylinder so as to adjust the time which it requires to raise the piston 230 for operating the valve 177. However, in as much as it is desired to quickly restore the system to its original position after the pressure operation has been completed the check valve 261 is provided which is adjusted to allow the air to escape from the timing cylinder 220 more rapidly than it could through the needle valve 262.

If for any reason during the ironing operation the operator desires to immediately shut off the pressure being applied to the ironing head, she may do so by merely stepping on the treadle 226 which allows high pressure air from the tank 215 to enter the timing chamber 220 thus quickly opening the valve 177 and clearing the system of compressed air. Obviously, once the air is allowed to escape from the chambers 235 and 236 in the cylinder 148 the counterweight 143 becomes effective to relax the toggle thus and to restore the head to its upper position away from the ironing buck.

From the foregoing it will be evident that in my press the bed has a heated cushion of circulating air under its padding which air is of a high enough temperature to cause any moisture coming into contact with the pad during the operation of the press to be immediately vaporized so as to enable such vapor to escape readily from the press or to be intrained in the circulating mass of air thus preventing such moisture from being driven into the padding.

Another advantage of this feature of the machine is that the moisture or vapor escaping laterally from the machine serves to prevent the drying of the unironed parts or lays of the article adjacent to the part being treated.

The cushion of air under the padding in the bed or stationary buck consists of heated air circulated under the padding at a high speed by the blower and of volume and force predetermined to take into account leakage of air through the pores of the padding. In other words, the press is so designed that during the operation of the blower there is at all times a sufficient volume of air under the padding in the bed as to enable it to be ballooned for the purpose previously described. The ballooning of the padding on the stationary buck is, of course, advantageous in that it enables articles such as silk, imitation silk or woolen goods to be dried and ironed without the application of any very substantial pressure to the articles, thereby preventing shrinking, hardening and discoloring of such articles during the ironing operation.

A still further advantage of the invention resides in the fact that in my machine both sides of the article are subjected to intense heat so that the article is necessarily finished on both sides in a single lay of the article whereas heretofore it has not been possible in a conventional ironer to finish both sides of the article in a single lay.

I also find that a press embodying the features of my invention and provided with 675 square inches of ironing surface is so much more efficient than the conventional press that it is possible for the laundry owner to use four of my machines in place of six of the conventional presses to do an equal amount of work as that turned out by the six presses.

Heretofore the manufacturers of ironing presses have in their advertising emphasized the fact that by the use of intense pressure in their machines they have greatly increased the speed of such machines. To operate these conventional machines it is usually necessary to furnish the machines with at least 75 pounds of dried air and 100 pounds of steam pressure. In my press by using the aeration feature I find that at least 80 per cent less pressure is used per square inch than that employed in conventional machines. In fact, with 50 pounds of air it is possible with my machine to dry and iron more tons of goods in a given period of working unit than is possible with the machines on the market at the present time.

Also, in my machine due to the aereation feature I have been able to materially reduce the distance between the two bucks when the upper one or head is raised out of cooperation with the lower one, or, in other words, when it is in inoperative position. In a conventional press it has not been possible to decrease the distance between the ironing members to a distance of any less than ten or twelve inches for the reason that in such presses the ironing members are intensely hot and the operator would burn her hands in making a lay of an article on the bed if the ironing members were moved any closer together. The ballooning of the padding on the bed of my machine clearly minimizes the possibility of the operator burning her hands in making a lay of an article thereon and also permits of the head being suspended at a considerably less distance from the bed than is possible in a conventional press.

When the head of my press is in its uppermost position it has a temperature of approximately 250 degrees F. At this time the buck or bed has a temperature of 230 degrees F. whereas the padding thereon has a temperature of only 110 degrees F., and the article laying on the padding will have a temperature of about 68 degrees F.

In the second position of the press or, in other words, at aereating position, the ironing head is disposed about 1½ inches above the buck. The lowering of the head will, of course, set into operation the blower and as a result the padding and article are ballooned on the bed. Under these conditions I find that the padding and the article assume a temperature of 168 degrees F.

In a third position of the press head, at which time the head was just being lowered on its pressure stroke, temperatures were taken and I found that the padding and article then had a temperature of approximately 212 degrees F.

The above facts clearly indicate that as the head is lowered into cooperation with the stationary buck the temperature of the article and padding increases.

In experiments which I have conducted in connection with my press I found, by taking an article that normally weighed about 15 ounces and adding to it about 15 ounces of water, that increasing amounts of this moisture were removed from the article as the operation of my press thereon progressed. I found that during the aereation step of my ironing process four ounces of this moisture were removed in the first minute of operation and an additional four ounces were removed in the second minute, making a total of eight ounces. Thereafter on the pressure stroke of the press I found that it took seven seconds to remove the remaining seven ounces of moisture from the article. This moisture was found to escape at the ends of the ironing members into the atmosphere. As soon as the press was opened the padding was found to be hot, dry and soft and had the appearance of being new.

Now, it is, of course, to be understood that although I have illustrated a preferred embodiment of my invention, the invention is not to be thus limited, but only insofar as defined by the scope and spirit of the appended claims.

I claim as my invention:

1. In combination in an ironing machine, an ironing buck, an ironing head, means for moving said head toward said buck, padding secured at its edges to the buck, means including a conduit forming a closed circulatory path for applying air under pressure against the underside of said padding to inflate the same, the pressure of the air being sufficient to hold the padding inflated when the ironing head is brought against an article to be ironed laid on said padding, said padding being sufficiently pervious for the flow of part of the air therethrough while under inflation whereby the article is resiliently held against the ironing head to be ironed and is simultaneously subjected to flow of air for rapidly removing surplus moisture therefrom.

2. In combination in an ironing machine, an ironing buck, an ironing head, means for moving said head toward said buck, said buck having a chamber therein, padding applied over said buck and said chamber and secured at its edges to said buck, means including a conduit forming an air circulatory path including said chamber, means for circulating air under pressure through said path, the pressure of said air being sufficient to inflate and hold said padding inflated when the ironing head is brought against an article on said padding to be ironed, said padding being sufficiently pervious for the flow of part of the air therethrough while under inflation whereby the article is resiliently held against the ironing head and is simultaneously subjected to flow of air therethrough for rapidly removing surplus moisture therefrom.

3. In combination in an ironing machine, a pair of cooperable and relatively movable ironing members, one of said members having padding thereon adapted to have an article placed thereon, means for moving one of said members into a position in proximity to the other member, means for ballooning the padding on said first member to cause the article thereon to be formed against said other ironing member, and means including a conduit forming a closed circulatory path for causing air under pressure to blow through and away from said padding and article during such forming of the article whereby surplus moisture is removed from said article and padding.

4. In combination in an ironing machine, an ironing buck having a chamber and a padding disposed thereover adapted to be ballooned, and means including a duct forming a closed path for circulating heated air under pressure through said chamber whereby to balloon said padding and whereby an article on said padding is continuously subjected to heat and conveyance away therefrom of the moisture-laden air.

In testimony whereof I have hereunto subscribed my name at Waukegan, Lake County, Illinois.

CHARLES O. REEPS.